(12) United States Patent
Vaccari

(10) Patent No.: US 11,247,385 B2
(45) Date of Patent: *Feb. 15, 2022

(54) THREE-DIMENSIONAL PRINTING PROCESS FOR OBTAINING A MANUFACTURED ARTICLE WITH MATERIAL EFFECT

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 196 days.

This patent is subject to a terminal disclaimer.

(21) Appl. No.: 16/610,522

(22) PCT Filed: May 7, 2018

(86) PCT No.: PCT/IB2018/053156
§ 371 (c)(1),
(2) Date: Nov. 4, 2019

(87) PCT Pub. No.: WO2018/207076
PCT Pub. Date: Nov. 15, 2018

(65) Prior Publication Data
US 2020/0147862 A1    May 14, 2020

(30) Foreign Application Priority Data
May 9, 2017 (IT) .......................... 102017000050259

(51) Int. Cl.
*B29C 64/106* (2017.01)
*B29C 64/153* (2017.01)
(Continued)

(52) U.S. Cl.
CPC ............ *B29C 64/106* (2017.08); *B22F 10/20* (2021.01); *B29C 64/153* (2017.08);
(Continued)

(58) Field of Classification Search
CPC ... B29C 64/106; B29C 64/153; B29C 64/386; G06T 17/00; B33Y 10/00; B33Y 30/00; B33Y 50/00; B33Y 80/00; B22F 2998/10
See application file for complete search history.

(56) References Cited

U.S. PATENT DOCUMENTS 9,818,383 B2 * 11/2017 Shahbazmohamadi ......................
  G06T 19/20
2001/0043990 A1    11/2001   Chong et al.
(Continued)

FOREIGN PATENT DOCUMENTS

| WO | WO 2017/027351 | 2/2017 |
| WO | WO 2017/195110 | 11/2017 |
| WO | WO 2018/207076 | 11/2018 |

OTHER PUBLICATIONS

International Search Report and the Written Opinion dated Jul. 6, 2018 From the International Searching Authority Re. Application No. PCT/IB2018/053156. (9 Pages).

*Primary Examiner* — Yung-Sheng M Tsui

(57) ABSTRACT

The three-dimensional printing process for obtaining a manufactured article with material effect comprises:
  a supply step of an image (1) in digital format reproducing a wooden surface portion provided with a plurality of grains (2), comprising a plurality of pixels;
  an identification step of a color range datum of each of pixels by means of a software;
  a transformation step of the color range datum into a depth spatial datum to produce a three-dimensional digital model of a manufactured article with material effect (3) provided with an outer surface (4) reproducing the grains (2) by means of a plurality of grooves (5) with variable depth;
  a three-dimensional printing step of the model to obtain the manufactured article with material effect (3) by means of a molding device (10, 13); and
(Continued)

a painting step of the outer surface (4) by means of a paint (9), the paint (9) accumulating in the grooves (5) and reproducing the color range of the grains (2).

7 Claims, 3 Drawing Sheets

(51) Int. Cl.
| | |
|---|---|
| *B29C 64/386* | (2017.01) |
| *G06T 17/00* | (2006.01) |
| *B22F 10/20* | (2021.01) |
| *B33Y 10/00* | (2015.01) |
| *B33Y 30/00* | (2015.01) |
| *B33Y 50/00* | (2015.01) |
| *B33Y 80/00* | (2015.01) |

(52) U.S. Cl.
CPC ............ *B29C 64/386* (2017.08); *G06T 17/00* (2013.01); *B22F 2998/10* (2013.01); *B33Y 10/00* (2014.12); *B33Y 30/00* (2014.12); *B33Y 50/00* (2014.12); *B33Y 80/00* (2014.12)

(56) References Cited

U.S. PATENT DOCUMENTS

| | | | |
|---|---|---|---|
| 2003/0032214 A1 | 2/2003 | Huang | |
| 2010/0221504 A1* | 9/2010 | Bauer | B29C 64/112 |
| | | | 428/195.1 |
| 2017/0037674 A1* | 2/2017 | Hooper | B33Y 10/00 |
| 2017/0203519 A1* | 7/2017 | Lewis | B32B 29/005 |
| 2017/0232872 A1* | 8/2017 | Faruque | B60N 2/75 |
| | | | 297/411.46 |

* cited by examiner

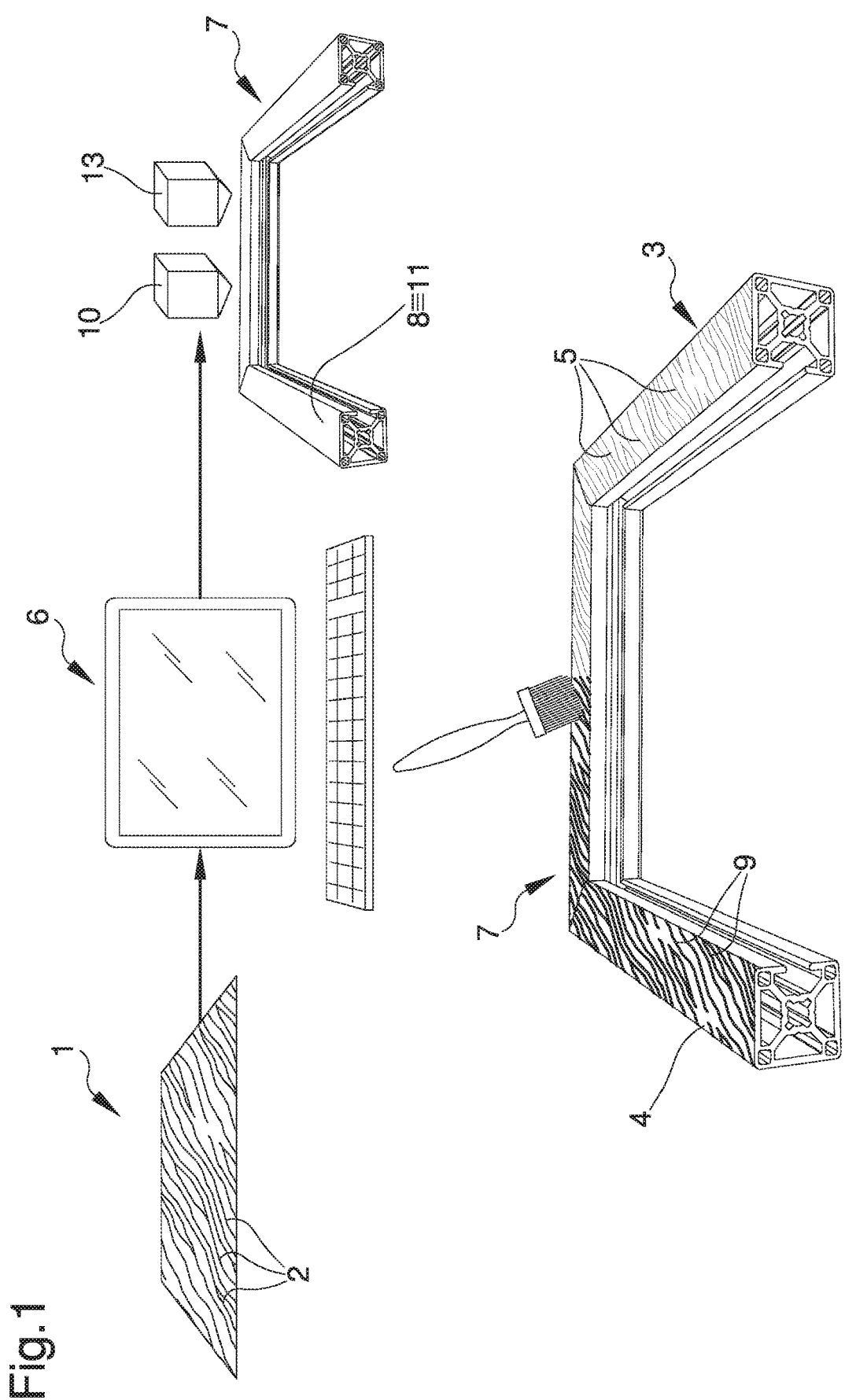

THREE-DIMENSIONAL PRINTING PROCESS FOR OBTAINING A MANUFACTURED ARTICLE WITH MATERIAL EFFECT

RELATED APPLICATIONS

This application is a National Phase of PCT Patent Application No. PCT/IB2018/053156 having International filing date of May 7, 2018, which claims the benefit of priority Italian Patent Application No. 102017000050259 filed on May 9, 2017. The contents of the above applications are all incorporated by reference as if fully set forth herein in their entirety.

FIELD AND BACKGROUND OF THE INVENTION

The present invention relates to a three-dimensional printing process for obtaining a manufactured article with material effect.

The production and marketing is known of elements of various kinds with a surface finish that reproduces a material effect, i.e. a surface finish which permits reproducing the visual and/or tactile effect of a chosen natural material.

These are, therefore, elements in metallic or synthetic materials made with an external decoration reproducing the visual and, in some cases, tactile texture of natural materials of various kinds, in particular wood.

A typical example of this type of manufactured articles concerns window frames and frameworks, door frames and frames in general.

Generally, these elements are made of metal or plastic by extrusion or similar processes and are subsequently decorated.

The decoration of the frames to obtain the material effect can be carried out using various techniques.

One technique used to obtain the material effect on frames is, e.g., the sublimation of the pigment, which consists in printing the design simulating the wood grains on a flat surface on a special medium and then transferring it hot onto the surface to be decorated, suitably pre-treated so as to be perfectly receptive.

The transfer of the decoration takes place at high temperatures and with appropriate vacuums whereby the solid pigment is directly transformed into steam and simultaneously penetrates into the pre-treated surface of the frame.

An alternative method commonly used to obtain the material effect is the powder on powder deposition, by which polyester powders of different colors in solid form are incorporated directly into the pre-treatment layer of the frame.

Another method that can be used to obtain the material effect consists in the application of a decorative film made of a material which is sufficiently resistant and reproduces a design that simulates the grains of wood directly on the surface to be decorated.

These processes for the production of elements with material effect do however have a number of drawbacks.

In fact, these processes are very complex, requiring long times and complex operating conditions, with a consequent increase in production costs.

Furthermore, these processes do not guarantee that a precise and realistic decoration with high aesthetic value will be achieved for all the machined parts.

SUMMARY OF THE INVENTION

The main aim of the present invention is to provide a three-dimensional printing process for obtaining a product with a material effect that allows obtaining a precise and credible decoration, increasing the appreciation by the customers.

Within the illustrated aim, one object of the present invention is to provide a three-dimensional printing process for obtaining a product with a material effect that allows simplifying the operating conditions and reducing production times.

Another object of the present invention is to allow the reduction of production costs with respect to known processes.

Another object of the present invention is to provide a three-dimensional printing process for obtaining a manufactured article with material effect which allows overcoming the aforementioned drawbacks of the prior art within the scope of a simple, rational, easy, efficient to use and cost-effective solution.

DESCRIPTION OF THE SEVERAL VIEWS OF THE DRAWINGS

Other characteristics and advantages of the present invention will become more evident from the description of a preferred, but not exclusive embodiment of a three-dimensional printing process for obtaining a manufactured article with material effect, illustrated by way of an indicative, but non-limiting example, in the attached drawings in which:

FIGS. 1, 2, 3 and 4 are axonometric views of the steps of the process according to the invention;

DESCRIPTION OF SPECIFIC EMBODIMENTS OF THE INVENTION

Figure 3:
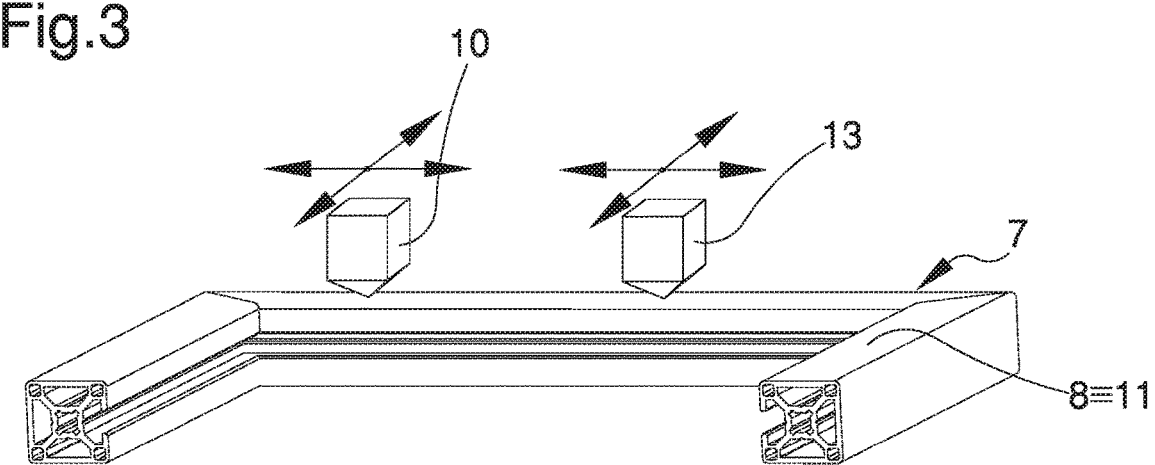
Figure 4:
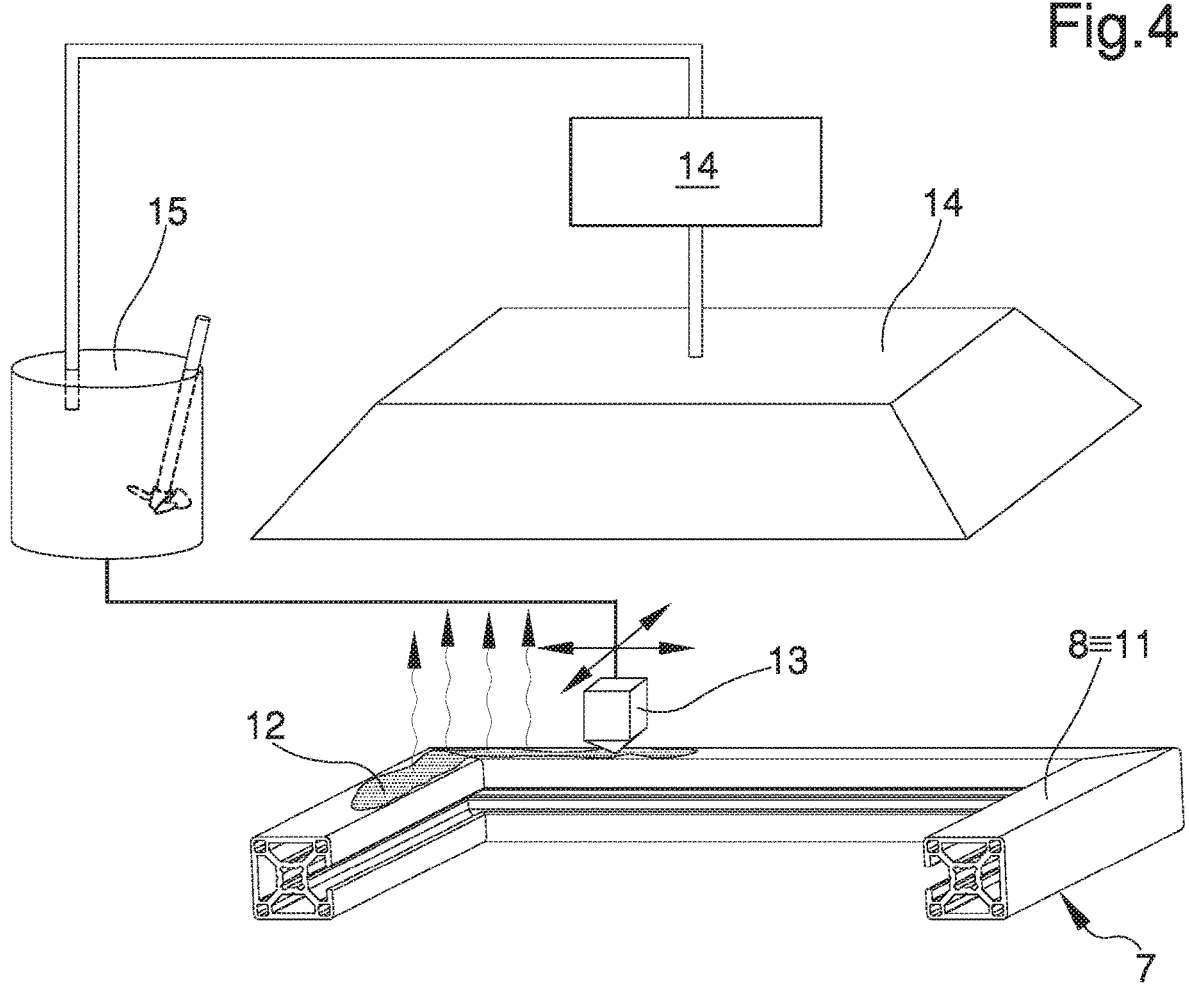
Figure 5:
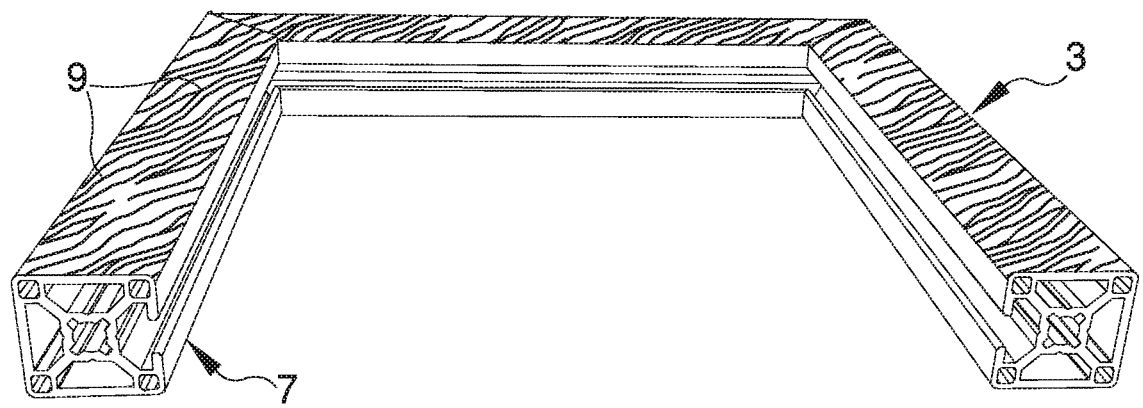
FIG. 5 is an axonometric view of a manufactured article with material effect obtained by means of the process according to the invention.
Figure 6:
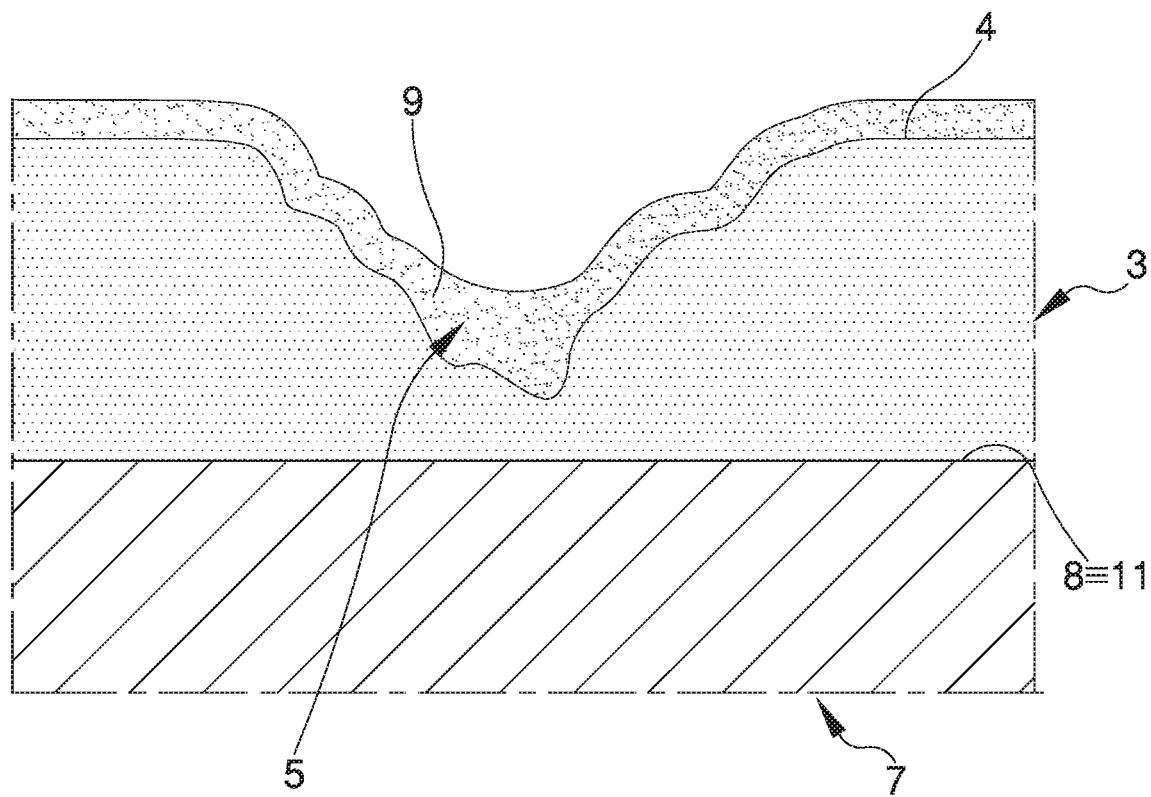
FIG. 6 is a sectional view of a detail of the manufactured article with material effect of FIG. 5.

The three-dimensional printing process for obtaining a manufactured article with material effect comprises:
- at least one supply step of at least one image 1 in digital format reproducing at least one wooden surface portion provided with a plurality of grains 2, comprising a plurality of pixels;
- at least one identification step of at least one color range datum of each of the pixels by means of at least one software;
- at least one transformation step of the color range datum into at least one depth spatial datum to produce at least one three-dimensional digital model of at least one manufactured article with material effect 3 provided with at least one outer surface 4 reproducing the grains 2 by means of a plurality of grooves 5 with variable depth; and
- at least one three-dimensional printing step of the model in order to obtain the manufactured article with material effect 3 by means of at least one molding device 10, 13.

Within the scope of this treatise, "color range" means the color intensity of each pixel in image 1, with reference to every possible color, including black and white. Consequently, the software used allows identifying the color range datum for any image 1 in digital format whether in color, black and white or gray.

Advantageously, the depth of the grooves 5 is substantially proportionate to the color range of the grains 2.

The software used by means of the processing unit 6, therefore, allows producing a three-dimensional digital model equipped with grooves 5 having a depth which increases together with the increase in the intensity of the color range of the pixels relating to the single grain 2, so the material effect is reproduced from the visual and tactile point of view through the grooves themselves.

Preferably, the process comprises at least one supply step of at least one profiled element 7 provided with at least one deposition surface 8, onto which is applied the manufactured article with material effect 3 to form a thin layer of surface finish. Preferably, the profiled element 7 onto which the manufactured article with material effect 3 is applied is made from PVC, although the possibility to use a profiled element 7 made from a different type of material cannot be ruled out.

In the particular embodiment of the process shown in the illustrations, the three-dimensional printing takes place on the deposition surface 8 so as to apply the manufactured article with material effect 3 on the profiled element 7, although the possibility to perform the three-dimensional printing on media other than the profiled element 7 cannot be ruled out.

According to the invention, the process comprises at least one painting step of the outer surface 4 by means of at least one paint 9, subsequent to the step of three-dimensional printing.

In particular, the paint 9 used can be in a liquid and/or powder form.

In particular, the paint 9 tends to accumulate inside the grooves 5, reproducing the color range of the grains 2.

This way the surface shape of the profiled element 7 can be defined by recreating a material effect which is convincing not only from the tactile point of view of the surface finish, but also from the chromatic point of view, inasmuch as the paint 9 that accumulates in the grooves 5 allows recreating the chiaroscuro typical of the wood grains 2.

Usefully, the molding device 10, 13 used for the step of three-dimensional printing comprises at least one three-dimensional molding unit 10 provided with deposition means of at least one of a liquid photopolymer material and a metal-based pulverulent material onto the deposition surface 8 and solidification means of these materials.

Within the scope of this treatise, photopolymer material means a polymeric material the characteristics of which change as a result of exposure to light radiation located in the ultraviolet or visible region of the electromagnetic spectrum.

In other words, the exposure of the photopolymer material to light radiation causes the material to stiffen.

In particular, the liquid photopolymer material is selected from resin and rubber. Preferably, the deposition means are movable along a plurality of directions on a Cartesian plane substantially parallel to the deposition surface 8 for the distribution of the liquid photopolymer material and of the pulverulent material according to the desired end conformation.

Usefully, depending on the type of material delivered by the deposition means, the solidification means comprise at least one of a light emitting unit suitable for the solidification of the liquid photopolymer material and a sintering unit of the metal-based pulverulent material.

In particular, the light emitting unit is of the type of a source of ultraviolet or visible light radiation.

The sintering unit, on the other hand, performs a heat treatment on the metal-based pulverulent material, transforming it into an indivisible material, by means of a laser source that heats the pulverulent material with the aid of magnetic fields.

Advantageously, the step of three-dimensional printing comprises:
- at least one deposition step of at least one of the liquid photopolymer material and the metal-based pulverulent material onto a deposition plane 11 by means of the deposition means;
- at least one solidification step, subsequent to the deposition step, of at least one of the liquid photopolymer material and the metal-based material by means of the polymerization unit and the sintering unit respectively, for obtaining at least one layer;
- at least one substantially vertical growth step of the layer starting from the deposition plane 11.

In the particular case where the manufactured article with material effect 3 is applied to the profiled element 7, the deposition plane 11 coincides with the deposition surface 8.

Once the deposition and solidification steps of at least one of the photopolymer material and the pulverulent material have been carried out, the growth step is carried out.

This growth step consists of the execution of a plurality of deposition and solidification steps in order to obtain a plurality of solid layers that grow vertically on each other to form the manufactured article with material effect 3.

The possibility cannot be ruled out that, during the printing step, the deposition and solidification steps of the liquid photopolymer material and of the metal-based pulverulent material can be carried out simultaneously, so as to make different portions of the same profiled element 7 at the same time.

In combination or alternative to the deposition of the liquid photopolymer material and/or of the metal-based pulverulent material, the printing step also comprises:
- at least one supply step of PVC and of at least one solvent in which the PVC is soluble;
- at least one mixing step of the PVC and of the solvent to obtain at least one mixture in the liquid phase;
- at least one distribution step of the mixture onto a deposition plane 11; and
- at least one evaporation step of the solvent to obtain one layer of PVC 12 of the manufactured article with material effect 3, which is subsequent to the distribution step.

The printing step also comprises the repetition of the distribution step and of the evaporation step so as to obtain a plurality of overlapping layers of PVC 12 forming the manufactured article with material effect 3 which is applied to the profiled element 7.

PVC, or polyvinyl chloride, is a thermoplastic polymer with high strength and high elasticity, as well as resistant to contact with acids, alkaline and saline solutions, both diluted and concentrated, light, robust, insulating and with low gas permeability.

During the production of PVC according to its intended use and the characteristics required of the material, additives are added to PVC, so by varying the type and dose of these additives, it is possible to obtain a material with totally different characteristics.

In particular, typical additives that are added to PVC during manufacture are stabilizers to protect it from thermal degradation and improve its resistance to light and atmospheric agents, plasticizers to give the product flexibility and elasticity, lubricants to facilitate processing, pigments for coloring, etc.

Usefully, the molding device 10, 13 comprises at least one distribution assembly 13 provided with:
- at least one distribution head of the mixture onto the deposition plane 11; and
- at least one removal and recovery system 14 of the evaporated solvent.

Preferably, the distribution head is movable along a plurality of directions on a Cartesian plane substantially parallel to the deposition plane 11 for the distribution of the mixture to obtain a plurality of layers of PVC 12 depending on the final conformation of the desired manufactured article with material effect 3.

The distribution assembly 13 also comprises a mixing unit 15 of the PVC in the form of pellets and of the solvent, to obtain the mixture.

In the particular embodiment shown in the illustrations, the distribution assembly 13 works in a synergistic way with the three-dimensional molding unit 10, although embodiments cannot be ruled out wherein such distribution assembly 13 is used independently, e.g., exclusively, i.e. without the intervention of the three-dimensional molding unit itself, to obtain a manufactured article with material effect 3 entirely in PVC.

Usefully, the solvent used for the production of the mixture is at least one of a ketone and an ether.

In fact, although PVC is a rather inert material, it is soluble in some organic solvents, including ketones and ethers, which have on the one hand a physical action of softening polymer pellets and on the other a chemical action on the bonds of Van der Walls existing between macromolecules, bringing them into solution. Preferably, the solvent is at least one of a cyclic ketone and a cyclic ether, in particular cyclohexanone and tetrahydrofuran, which can be used individually or in mixture with each other and which are solvents particularly suitable for dissolving PVC, although the possibility to use different types of solvent cannot be ruled out. The mixture obtained in the mixing step of the PVC and at least one of the solvents is a liquid mixture, which can therefore be distributed on the deposition plane 11 in a simple way.

Furthermore, the possibility cannot be ruled out to add to the mixture at least one reinforcing material, which is added to PVC and to the solvent during the mixing step so as to make the layer of PVC 12 more resistant and increase the mechanical properties thereof.

Alternatively, it is possible to provide an auxiliary head which allows the deposition of the reinforcing material only.

Preferably, the reinforcing material is in the fiber form, although the possibility to use materials in a different form cannot be ruled out.

An example of a fiber material to be used is glass fibers, although different types of fiber can be used.

This solution could be particularly convenient if a manufactured article with material effect 3 is to be produced with an internal geometry different from those commonly provided, e.g. a honeycomb geometry.

In this case, the presence of reinforcing material permits increasing the mechanical properties of the PVC, in particular by increasing its strength.

Since the mixture is distributed by means of the distribution head, its viscosity must be equal to a fixed value such as to allow a simple distribution on the deposition plane 11, even in the event of a distribution head of different shape being used.

In particular, since PVC can have different characteristics as the additives contained therein vary, the percentage by weight of solvent with respect to PVC can be varied each time as the polymer charge varies, so that the viscosity of the mixture is maintained equal to the fixed value.

Therefore, the possibility cannot be ruled out to provide the distribution assembly 13 with a system for dosing the solvent from time to time according to the type of PVC used and the additives contained in it.

The evaporation step of the solvent substantially takes place immediately after the distribution step of the mixture.

Furthermore, the evaporation step of the solvent can be natural or forced.

In particular, in the case of forced solvent evaporation, it is possible to provide an evaporation device associated with the distribution assembly 13, such as e.g. a hot air blower, an infrared lamp or another heating element, which allows the solvent evaporation step to be accelerated so as to immediately follow the deposition step.

In fact, as soon as the mixture is distributed on the deposition plane 11, the solvent immediately tends to evaporate because of its high volatility, allowing the layer of PVC 12 to be obtained without the need for further solidification steps of the distributed material.

Preferably, in the event of the manufactured article with material effect 3 being made by distributing the mixture of PVC and solvent to form the layer of PVC 12, it is useful for the profiled element 7 to also be made of PVC.

In fact, the solvent contained in the mixture distributed on the deposition plane 11 for the realization of the model causes the PVC from which the profiled element 7 is made to undergo a surface softening.

Such softening action permits improving the adhesion of the layers of PVC 12 to the deposition plane 11, so that the profiled element 7 and the manufactured article with material effect 3 form a single block.

The solvent used to produce the mixture is toxic and highly flammable.

In particular, tetrahydrofuran forms highly explosive mixtures with air, is highly toxic in the case of oral contact and highly irritating to the skin and airways.

As regards cyclohexanone, this is a substance which also forms explosive mixtures with air, is corrosive and highly toxic, causing convulsions, hypothermia and bradycardia.

In both cases, these substances are also highly harmful to the environment.

For these reasons, the molding device 10, 13 is housed in a cabin in a controlled atmosphere, which prevents the dispersion of toxic vapors of the evaporated solvent during the processing steps and so as to protect the operators from any intoxication. The evaporated solvent is therefore recovered through the removal and recovery system 14, which sucks in the air present in the cabin and recovers the evaporated solvent, sending it back to the mixing unit 15 so as to avoid the continuous supply of new solvent and optimize production costs.

It has in practice been ascertained that the described invention achieves the intended objects.

In this regard, the fact is underlined that the particular solution of providing for a three-dimensional printing process to obtain a manufactured article with material effect makes it possible to render the material effect in a credible and precise manner.

In detail, the particular solution of providing a transformation step of a chromatic range datum into a spatial depth datum to produce a three-dimensional model, the three-dimensional printing step of the model to obtain the manufactured article with material effect and the painting step allows obtaining an extremely credible material effect both from the tactile point of view and from the visual point of view. Furthermore, the particular solution of providing the three-dimensional printing step to obtain the manufactured article with material effect permits simplifying the operating conditions and reducing production times, considerably cutting production costs.

Furthermore, the particular solution of using a three-dimensional molding unit permits making the manufactured article with material effect and having extremely limited machine dimensions.

Even furthermore, the particular solution of providing the mixing of PVC and a solvent to obtain a liquid mixture permits making the manufactured article with material effect while avoiding various solidification steps.

What is claimed is:

1. Three-dimensional printing process for obtaining a manufactured article with material effect, wherein said process comprises:
    at least one supply step of at least one image (1) in digital format reproducing at least one wooden surface portion provided with a plurality of grains (2), comprising a plurality of pixels;
    at least one identification step of at least one color range datum of each of said pixels by means of at least one software;
    at least one transformation step of said color range datum into at least one depth spatial datum to produce at least one three-dimensional digital model of at least one manufactured article with material effect (3) provided with at least one outer surface (4) reproducing said grains (2) by means of a plurality of grooves (5) with variable depth;
    at least one three-dimensional printing step of said model to obtain said manufactured article with material effect (3) by means of at least one molding device (10, 13); and
    at least one painting step of said outer surface (4) by means of at least one paint (9), said paint (9) accumulating in said grooves (5) and reproducing said color range of said grains (2)
    wherein said printing step comprises:
        at least one supply step of PVC and of at least one solvent in which said PVC is soluable;
        at least one mixing step of said PVC and of said solvent to obtain at least one mixture in the liquid phase;
        at least one distribution step of said mixture onto at least one deposition plane (11);
        at least one evaporation step of said solvent to obtain one layer of PVC (12) of said manufactured article with material effect (3), said evaporation step being subsequent to said distribution step; and
        repeating said distribution step and said evaporation step to obtain a plurality of said overlapping layers of PVC (12) forming said manufactured article with material effects (3).

2. Process according to claim 1, wherein said process comprises at least one supply step of a profiled element (7) provided with at least one deposition surface (8), said three-dimensional printing taking place onto said deposition surface (8) to apply said manufactured article with material effect (3) on said profiled element (7).

3. Process according to claim 1, wherein the depth of said grooves (5) is substantially proportional to said color range of said grains (2).

4. Process according to claim 1, wherein that said molding device (10, 13) comprises at least one distribution assembly (13) provided with:
    at least one distribution head of said mixture onto said deposition plane (11); and
    at least one removal and recovery system (14) of said evaporated solvent.

5. Process according to claim 4, wherein said distribution assembly (13) comprises at least one mixing unit of said PVC and of said solvent to obtain said mixture.

6. Process according to claim 4, wherein said mixture comprises said solvent in a percentage by weight with respect to said PVC so that the viscosity of the mixture is equal to a fixed value.

7. Process according to claim 4, wherein said solvent is at least one of cyclohexanone and tetrahydrofuran.

* * * * *